United States Patent [19]
Sato et al.

[11] Patent Number: 5,404,004
[45] Date of Patent: Apr. 4, 1995

[54] BAR CODE READER HAVING N COUNTERS AND N-1 COMPOSERS

[75] Inventors: Shinich Sato; Isao Iwaguchi, both of Kawasaki, Japan

[73] Assignee: Fujitsu Limited, Kawasaki, Japan

[21] Appl. No.: 223,325

[22] Filed: Apr. 5, 1994

Related U.S. Application Data

[63] Continuation of Ser. No. 49,442, Apr. 20, 1993, abandoned.

Foreign Application Priority Data

Apr. 20, 1992 [JP] Japan ................................. 4-099725

[51] Int. Cl.$^6$ ............................................... G06K 7/10
[52] U.S. Cl. ..................................... 235/463; 235/462; 235/472; 235/437; 235/436; 235/440
[58] Field of Search ............... 235/462, 463, 467, 470, 235/472, 440, 437, 436

[56] References Cited

U.S. PATENT DOCUMENTS

| | | | |
|---|---|---|---|
| 4,608,489 | 8/1986 | Ramsey et al. | 235/462 |
| 5,019,694 | 5/1991 | Collins, Jr. | 235/462 |
| 5,042,619 | 8/1991 | Kohno | 235/440 |
| 5,081,342 | 1/1992 | Knowles et al. | 235/440 |
| 5,278,397 | 1/1994 | Barkan et al. | 235/472 |

*Primary Examiner*—Donald Hajec
*Assistant Examiner*—Esther Chin
*Attorney, Agent, or Firm*—Staas & Halsey

[57] ABSTRACT

A bar code reader employs plural scanners for scanning a bar code mark with respective, plural optical scanning beams, counters connected with the scanners respectively producing numerical data representing the widths of corresponding black and white bars of the bar code. A composer selects the numerical data from the scanners so as to produce composed numerical data, and a decoder decodes the composed numerical data and produces a bar code data signal output. The composer, upon detecting a false data such as an overflow error data or waveform error data present in the respective numerical data output of a first selected scanner, switches therefrom to the respective numerical data output of a second scanner.

10 Claims, 13 Drawing Sheets

: 100m/SEC

FIG. 5A
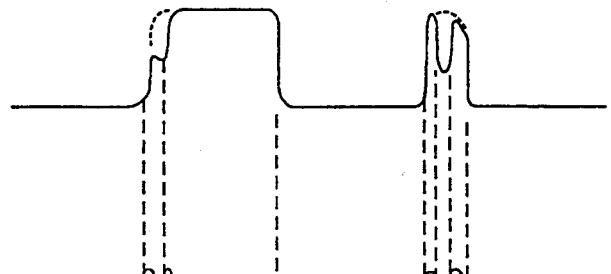
FIG. 5B
FIG. 5C
FIG. 6
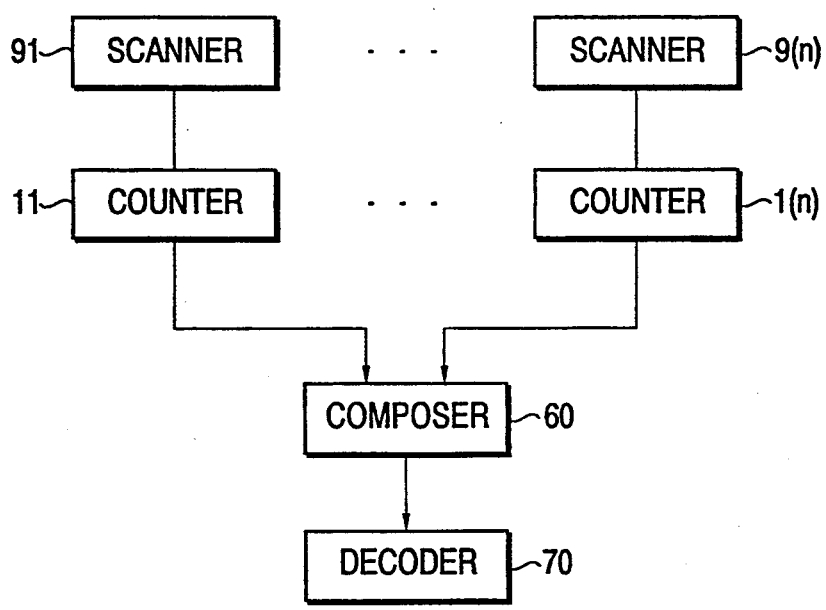

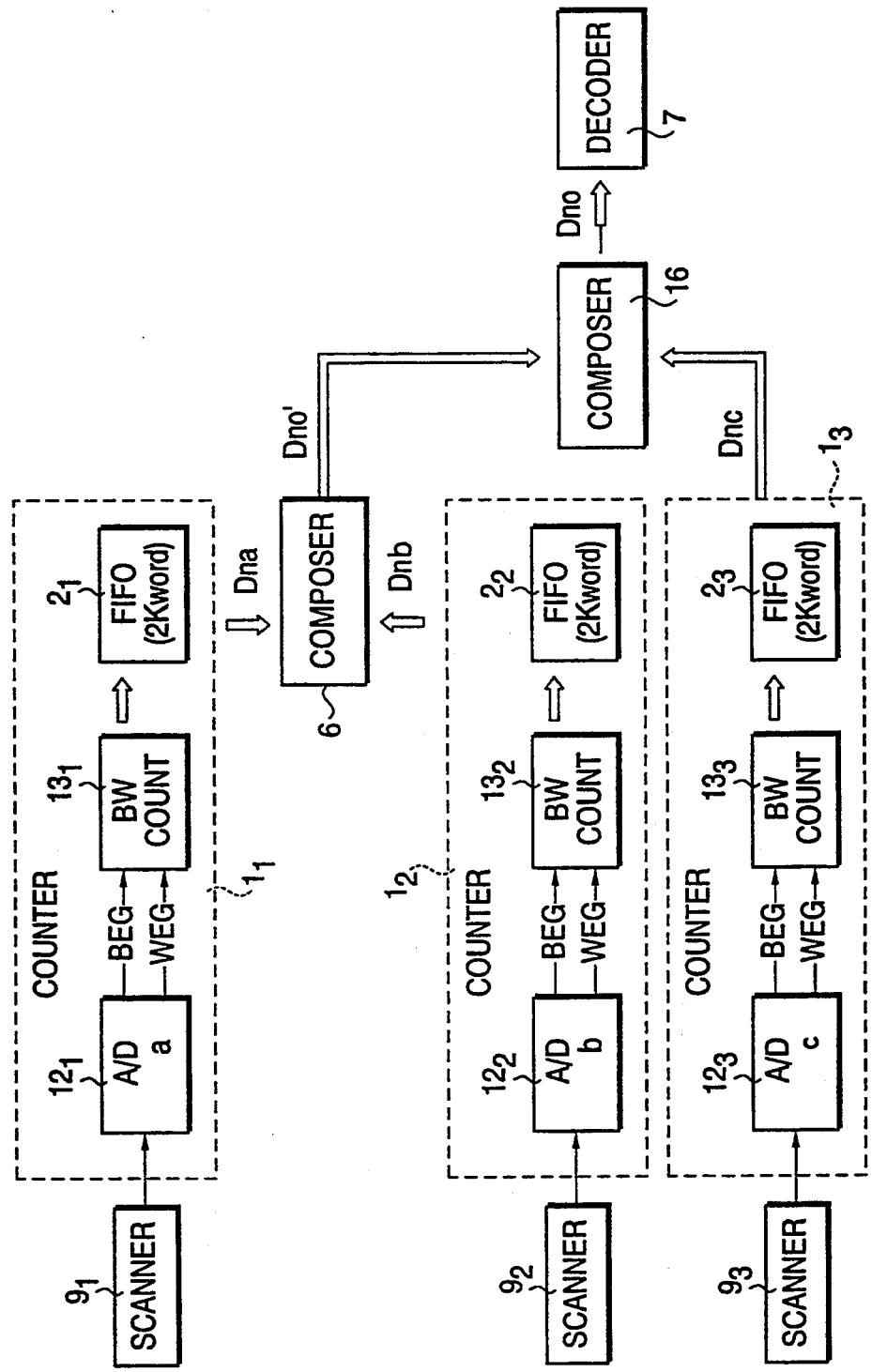

BAR CODE READER HAVING N COUNTERS AND N-1 COMPOSERS

This application is a continuation of application Ser. No. 08/049,442, filed Apr. 20, 1993, now abandoned.

BACKGROUND OF THE INVENTION

1. Field of the Invention

The present invention relates to a bar code reader for optically reading a bar code mark affixed on an object and electrically producing numerical data relating to the bar code, and particularly to a bar code reader having a plurality of beam scanners for scanning the bar code mark with optical beams in respective, different directions for reading the bar code correctly and speedily.

2. Description of the Related Art

FIG. 1 shows a block diagram of a bar code reader 99 of the related art. The bar code reader 99 consists of: scanners, for example, two scanners (SCANNERs) 91 and 92; counters (COUNTERs) 11 and 12 operating with SCANNERs 91 and 92 respectively; decoders (DECODERs) 71 and 72 corresponding to COUNTERs 11 and 12, respectively; and a central processing unit (CPU) 8 for processing decoded signals form DECODERs 71 and 72 and controlling operation of SCANNERs 91 and 92, COUNTERs 11 and 12 and DECODERs 71 and 72.

The SCANNER 91 (92) comprises an automatic power controller (APC) 921 (922) for driving a laser diode (LD) 951 (952) so as to make LD 951 (952) radiate constant power of laser; and optical system 911 (912) for producing a laser beam, scanning a bar code mark (BAR CODE MARK) on an object with the laser beam and receiving light reflected from BAR CODE MARK irradiated by the laser beam.

FIG. 2A is an outer view of SCANNERs 91 and 92, and FIG. 2B is a perspective view illustrating SCANNER 91 (92). In FIGS. 2A and 2B, the same respective reference numerals as in FIG. 1 designate the same part as in FIG. 1.

In FIG. 2B, the laser beam radiated from LD 951 (952) under the control of CPU 8 is directed to a polygonal mirror 981 (982) by plane mirrors as shown with a line having an arrow. The laser beam radiated from LD 951 (952) is rotatingly reflected by the polygonal mirror 981 (982), which is rotated at a constant angular speed by a rotating motor 941 (942) shown in FIG. 1. The rotating, reflected beam is reflected in succession and respectively by three segments of a slanted flat mirror 971 (972). The segments of the slanted flat mirror[s] 971 (972) face the polygonal mirror 981 (982) but are angularly slanted relatively to the reflected beam, so that three rotating, reflected beams are produced. These three beams are reflected by a common plane mirror 991 (992) and pass through a hologram window 961 (962) so as to scan the object 99 placed at the front (opposite) side of the hologram window 961 (962). The SCANNERs 91 and 92 are provided in structure in which the hologram window 961 makes approximately a right angle with the hologram window 962, as shown in FIG. 2A. Therefore, when the object 99 is placed in the right angle opening, the object 99, and therefore the BAR CODE MARK on the object 99, is scanned by two groups, of three beams per group, respectively from SCANNERs 91 and 92, which is very effective in accomplishing the correct and speedy reading of the bar code.

The light reflected from BAR CODE MARK arrives at a corresponding detector (DET) 131 (132) of the COUNTER 11 (12), after passing through a path including the hologram window 961 (962), the common plane mirror 991 (992), the segments of the flat slanted mirror 971 (972), the polygonal mirror 981 (982), a concave mirror 911-11 (911-12) which collects the reflected light and a folded mirror 911-21 (911-22) which guides the collected light to DET 131 (132). When DET 131 (132) receives the light, DET 131 (132) produces an electric analog signal including bar code information.

In COUNTER 11 (12) shown in FIG. 1, the analog bar code signal produced by DET 131 (132) is converted to a digital bar code signal by an analog to digital converter (A/D) 111 (112) which is connected with, and receives the analog signal output of, DET 131 (132). The digital bar code signal is sent to a bar width counter (BW COUNT) 121 (122) in which the effective time width, between the digital bar code signals corresponding to each set of successively scanned, adjacent black and white bars of the bar code, is counted, successively for all such sets, using a clock signal output by a clock signal generator (CLOCK) 10, and thereby producing a sequence of numerical data corresponding to the black and white bars.

The above description regarding the count of the time duration of the black and white bars is depicted in FIGS. 3A to 3E. FIG. 3A illustrates the optical beam at four successive positions, represented by four corresponding circles, in a scan path when scanning the white and black bar marks in a direction from left to right, as shown by a large arrow in FIG. 3A. Only the black bar marks are shown, but spaces preceding and following each black bar mark, and thus between adjacent black bars, represent corresponding white bar marks.

FIG. 3B illustrates the analog signal output from DET 131 (132) when the beam scans the bar code marks as shown in FIG. 3A. In FIG. 3B, a positive level of the analog signal represents a black bar mark, and each negative level, preceding and following a positive level of the analog signal, and thus between successive positive levels of the analog signal, represents a white bar mark.

FIGS. 3C and 3D show the digital signals from A/D 111 (112). The digital signal (BEG) shown in FIG. 3C includes a positive pulse produced at a leading edge, and the digital signal (WEG) shown in FIG. 3D includes a positive pulse produced at a trailing edge, of each positive level analog signal. The digital signals (BEGs and WEGs) shown in FIGS. 3C and 3D as produced by A/D 111 (112) are supplied to BW COUNT 121 (122) which counts the time duration between each leading edge signal and a next adjacent, or successive, trailing edge signal by the clock signal, producing the numerical data of, for example, 11 bits. The numerical data for each white bar and that for each black bar are obtained alternately, i.e., produced in alternating succession, as shown in FIG. 3E. The numerical data D0, D2, D4 and D6 represent the numerical data on the white bars and D1, D3 and D5 represent the numerical data on the black bars.

The successive numerical data D0 to D6 corresponding to the alternating white and black bars are held in a well known first-in first-out register (FIFO) 21 (22)

shown in FIG. 1, for arranging a time to send the numerical data to DECODER 71 (72).

The numerical data held in FIFO 21 (22) are sent to DECODER 71 (72) in accordance with a command sent from CPU 8. For simplicity, lines for transferring command signals and response signals between CPU 8 and other units such as FIFOs 21 (22) and DECODER 71 (72) are omitted in FIG. 1. In DECODER 71 (72), the numerical data are decoded to produce data used for displaying, printing, and calculating the information on the bar code and for sending the thus calculated information to a host computer not depicted in FIG. 1.

When the beam scans the object 99 having the BAR CODE MARK, the beam scans not only the BAR CODE MARK but also a margin of the BAR CODE MARK and, sometimes, even fails to scan the BAR CODE MARK. When the beam scans the margin or fails to scan the BAR CODE MARK, a false digital signal is produced by A/D 111 (112), causing FIFO 21 (22) to hold false numerical data. However, since an international standard code called Universal Products Code (UPC) is provided, the false numerical data can be detected on the basis of the UPC. According to the UPC, the time required to scan each black bar and each white bar is limited so as to be more than a minimum time and less than a maximum time, respectively, for each. In other words, the numerical data is limited so as to be in a specified range designated by a first data, which will be called a maximum data hereinafter, corresponding to the maximum counted number, and a second data, which will be called a minimum data hereinafter, corresponding to the minimum counted number. If a numerical data held in FIFO 21 (22) exceeds the maximum data or is not at least as great as the minimum data, the numerical data is removed from the numerical data to be used as representing the bar code. This is for avoiding mistakes in the bar code reading.

A case where a numerical data stored in FIFO 21 (22) exceeds the maximum data will be explained in reference to FIG. 4. FIG. 4 is a schematic planar view illustrating the arrangement of the segments of the slanted flat mirror 971 (972) relative to the polygonal mirror 981 (982) shown in FIG. 2B. In FIG. 4, when the beam is scanned by the rotating polygonal mirror 981 (982), the beam passes the segments of the slanted flat mirror 971 (972) along corresponding beam paths shown by lines, each having an arrow, and through gaps between the successive, adjacent segments of the slanted flat mirror 971 (972). When the beam scans the gap, a numerical data exceeding the maximum data is obtained. If the gap is 5 millimeter (mm) in length and the scan speed is 100 meters per second (m/s) along the beam path, the beam passes the gap in 50 micro-second (µs), as obtained from an expression:

$$5 \text{ mm} \div 100 \text{ m/s} = 50 \text{ } \mu s.$$

If an interval of the clock signal is 25 nano-second (ns), a count value corresponding to the gap is 2000, as obtained from an expression:

$$50 \text{ } \mu s \div 25 \text{ ns} = 2000 \text{ (counts).}$$

However, the maximum value, provided in the UPC, is 1408 counts and thus less than 2000 counts. Therefore, it is decided that the numerical data on the gap is false data, since exceeding the maximum data. The examination for determining whether there is a false data exceeding the maximum data will be called "overflow examination" hereinafter, and the false data which exceeds the maximum data will be called "overflow data" hereinafter.

A case where a numerical data held in FIFO 21 (22) is not at least equal to the minimum data will be explained in reference to FIGS. 5A to 5C. When the analog signal output from A/D 111 (112) has positive level waveforms corresponding to the black bars, the positive level waveforms should have the waveshape indicated by dotted contour lines, as shown in FIG. 5A. However, if the positive waveforms are broken (or defective), as shown by solid line curves in FIG. 5A because of, for example, defective printing of the bar code mark or electrical noise, defective digital signals are produced, e.g., having double digital signals at a single leading edge or having a very short time interval between the respective leading edge and trailing edge of each such defective positive waveform, as seen in FIGS. 5B and 5C. These false digital signals would produce false numerical data, each less than the minimum data. However, such false numerical data can be eliminated from being produced by examining whether the numerical data include a data, which will be called a "waveform error data" hereinafter, having an error due to the broken waveform and thus not satisfying the minimum data requirement. This examination will be called "waveform examination" hereinafter.

Though there is no such depiction in FIG. 1, the overflow examination has been performed in DECODER 71 (72) and the waveform examination has been performed in DECODER 71 (72) in cooperation with COUNTER 11 (12) in the prior art. Therefore, in the bar code reader of the prior art, there has been a problem, in that each decoder had to carry out a much too complex function with a large scale circuit and the bar code reader had to provide as many decoders as the number of counters, or of scanners, of the bar code reader. This causes a substantial manufacturing time and high costs of the bar code reader.

SUMMARY OF THE INVENTION

Therefore, an object of the present invention is to simplify the structure of the prior art bar code reader consisting of scanners, respective counters connected with the scanners, respective decoders connected with the counters and a central computing unit.

Another object of the present invention is to reduce the manufacturing time and costs of a bar code reader.

Still another object of the present invention is to increase the manufacturing and operating reliability of the bar code reader.

The above objects are achieved by reducing the number of the decoders to one and by providing composers, each provided between a group of two counters and the decoder, so that a numerical data, to be sent to the decoder, is composed selectively of the respective numerical data produced, or output, by the counters and wherein the false data examination is performed in the composers. The numerical data, as thus composed selectively of the numerical data output by the counters, will be called "composed numerical data" hereinafter.

The composer comprises a data switching circuit composed of a multiplexer (MUX) for switching the numerical data produced from first-in first-out registers (FIFOs) provided in the respective counters, so that the composed numerical data is composed of the numerical data from the FIFOs; a controller which controls the MUX and the FIFOs so as to perform the switching when a false data is detected in the composed numerical data; an overflow examiner for examining whether the overflow data is in the composed numerical data, producing an overflow signal when the overflow data is detected; and a waveform examiner for examining whether a waveform error is in the numerical data to be sent from the FIFOs to the MUX, producing a waveform error signal when the waveform error data is detected. The overflow signal and the waveform error signal are used by the controller for making the MUX perform the switching.

Providing the composers to the bar code reader and the false data examination is performed in the composer, the decoders each having performed the false data examination can be decreased to one. This results in the realization of the simple structure, the decrease of the manufacturing costs and time, and the high manufacturing reliability of the bar code reader.

BRIEF DESCRIPTION OF THE DRAWINGS

FIG. 5A illustrates a signal waveform which is the same as the signal waveform in FIG. 3B except that the signal waveform is partially broken, or defective;

FIG. 5B illustrates digital signals produced at leading edges of the defective signal waveform shown in FIG. 5A;

FIG. 5C illustrates digital signals produced at trailing edges of the defective waveform shown in FIG. 5A and which, in combination with the digital signal shown in FIG. 5B, results in waveform error data;

FIG. 6 is a schematic block diagram illustrating the principle of the present invention;

FIG. 14 is a schematic block diagram for illustrating a bar code reader of the fourth embodiment of the present invention.

DESCRIPTION OF THE PREFERRED EMBODIMENTS

Figure 1:
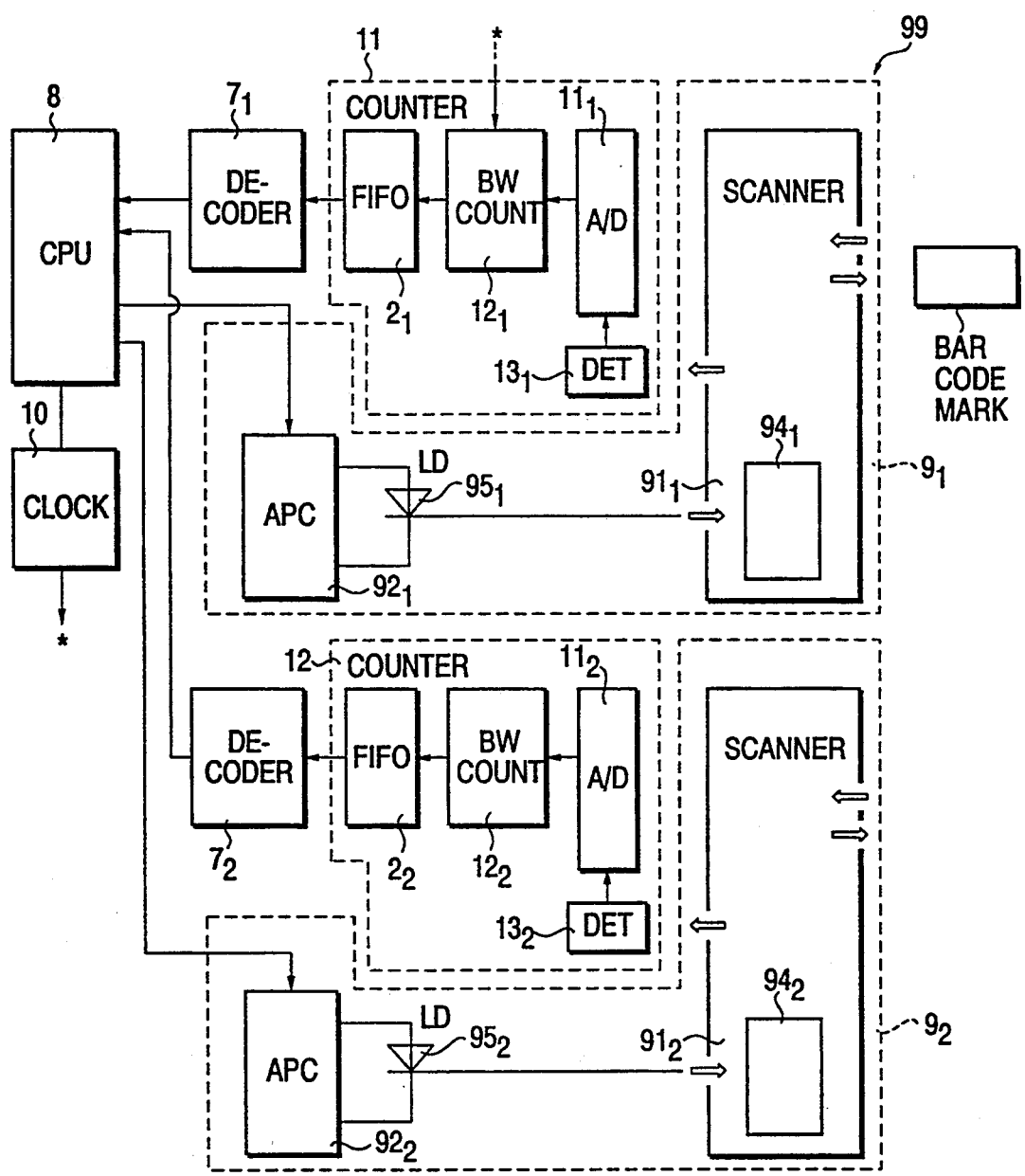
FIG. 1 is a block diagram of a bar code reader of the prior art.
Figure 2A:
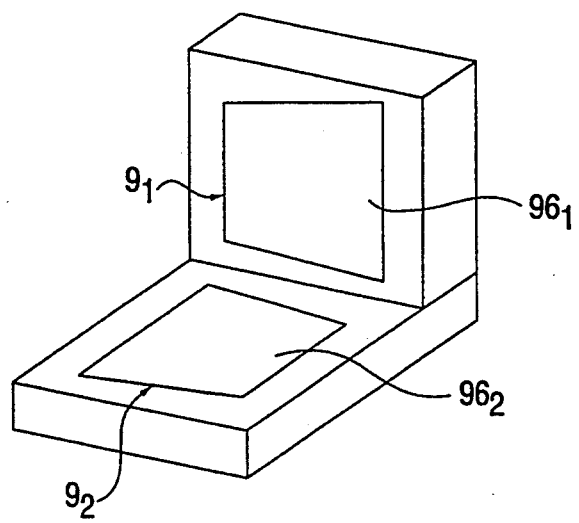
FIG. 2A is an outer view of a scanning unit of a bar code reader.
Figure 2B:
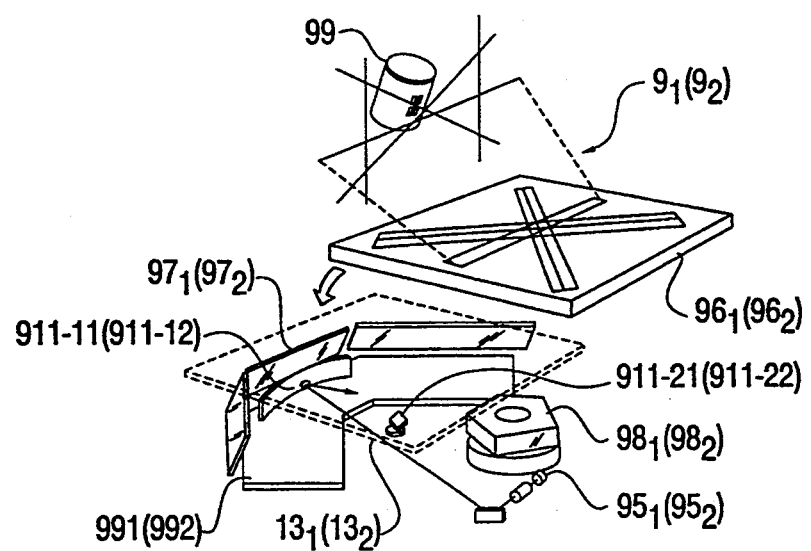
FIG. 2B is a perspective view illustrating an optical scanning system of the scanning unit.
Figure 3A:
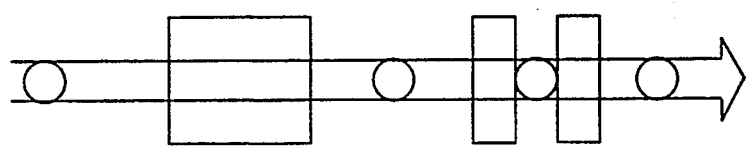
FIG. 3A is an illustration of an optical beam scanning white and black bar marks of a bar code mark.
Figure 3B:
FIG. 3B is a signal waveform illustrating an analog signal output of a detector of the bar code reader, resultant from the beam scans as shown in FIG. 3A.
Figure 3C:
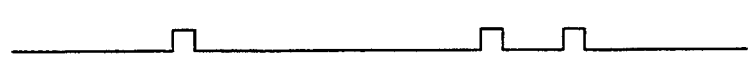
FIG. 3C is a signal waveform illustrating a digital signal output from the analog to digital converter, produced at a leading edge of each positive level of the waveform shown in FIG. 3B.
Figure 3D:
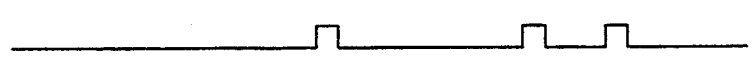
FIG. 3D is a signal waveform illustrating a digital signal output from the analog to digital converter, produced at the trailing edge of each positive level of the waveform shown in FIG. 3B.
Figure 3E:
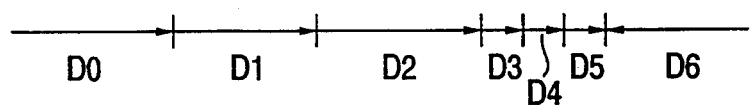
FIG. 3E is an illustration of the sequence of numerical data produced from the digital signals shown in FIGS. 3C and 3D.
Figure 4:
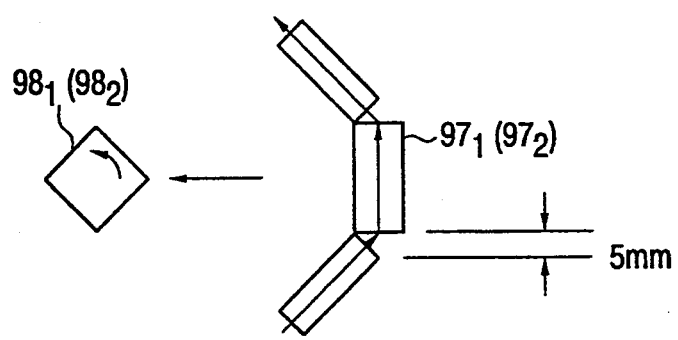
FIG. 4 is a schematic plan view illustrating the three pieces, or segments, of a flat slanted mirror which receives a beam from a polygonal mirror in the optical scanning system shown in FIG. 2B.

FIG. 6 is a schematic block diagram for illustrating the principle of the present invention. In FIG. 6, the same reference numerals as employed in FIG. 1 designate the same respective units as in FIG. 1. As shown in FIG. 6, in the present invention, the numerical data produced by COUNTERs 11, 12, - - -, 1(n−1) and 1(n), respectively connected to SCANNERs 91, 92, - - -, 9(n−1) and 9(n), are selectively sent to a composer (COMPOSER) 60. In COMPOSER 60, the numerical data received from the COUNTERs are composed to a composed numerical data. The composed numerical data is sent to a single decoder (DECODER) 70 so as to be decoded to a decoded bar code signal. The decoded signal is processed by CPU 8, not depicted in FIG. 6, so as to be, for example, counted, displayed or memorized, variously, in response to a demand from the user of the bar code reader. This is the principle of the bar code reader of the present invention.

Figure 7:
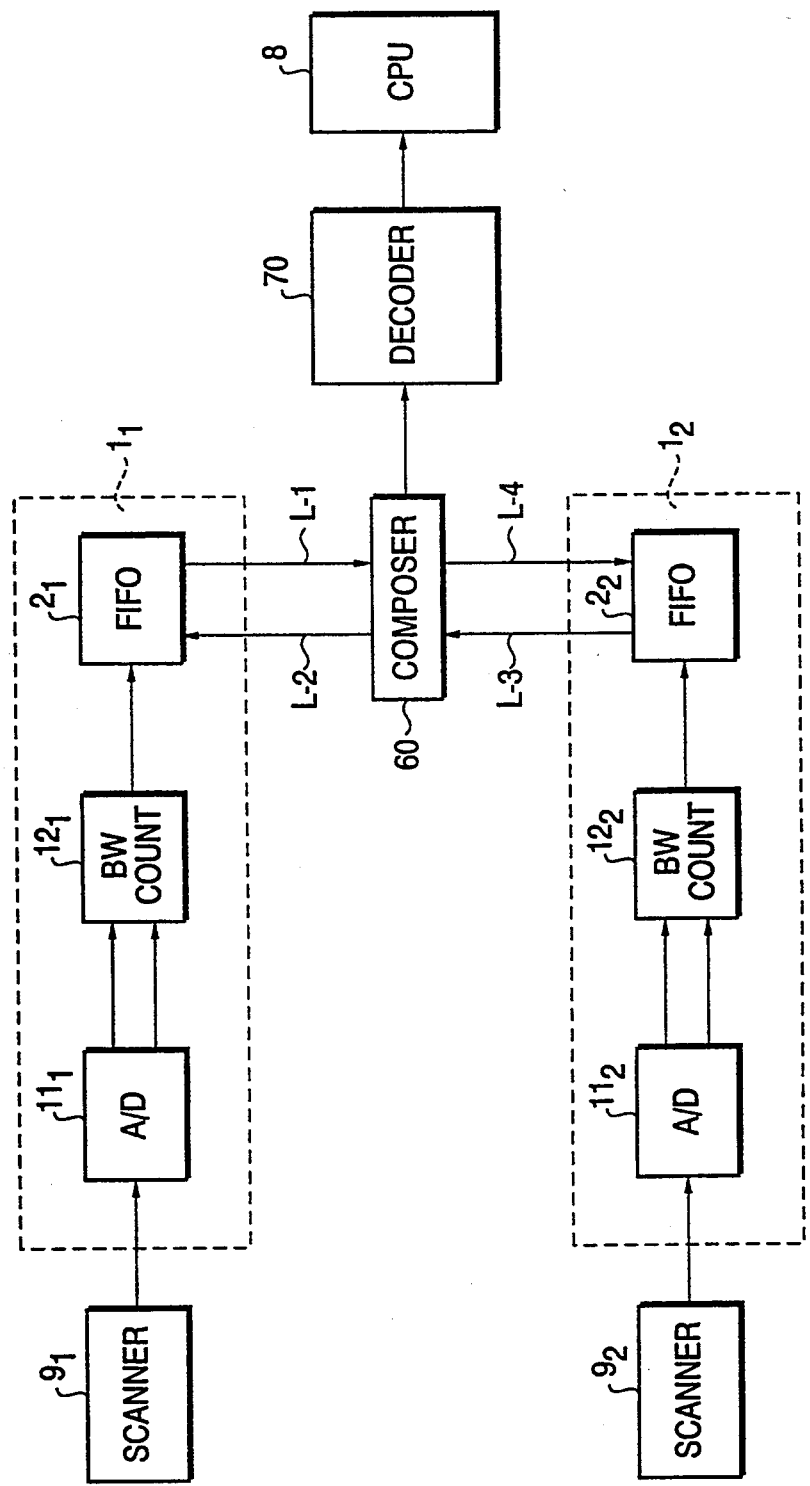
FIG. 7 is a schematic block diagram illustrating a bar code reader of the first embodiment of the present invention.

Applying the above principle to a bar code reader having two sets of scanners and associated counters, as shown in FIG. 1, a block diagram shown in FIG. 7 is obtained in the present invention. In FIG. 7, the same reference numerals as in FIGS. 1 and 6 designate the same respective units as in FIGS. 1 and 6. In FIG. 7, the numerical data are sent from FIFO 21 and 22 to COMPOSER 60 through connecting lines L-1 and L-3, respectively. Connecting lines L-2 and L-4 are provided to FIFO 21 from COMPOSER 60 and to FIFO 22 from COMPOSER 60, for selectively sending a changing command signal from COMPOSER 60 to FIFOs 21 and 22, respectively. The numerical data are not sent to COMPOSER 60 until each of FIFO 21 and 22 receives the respective changing command signal. The changing command signal will be explained later.

Figure 8:
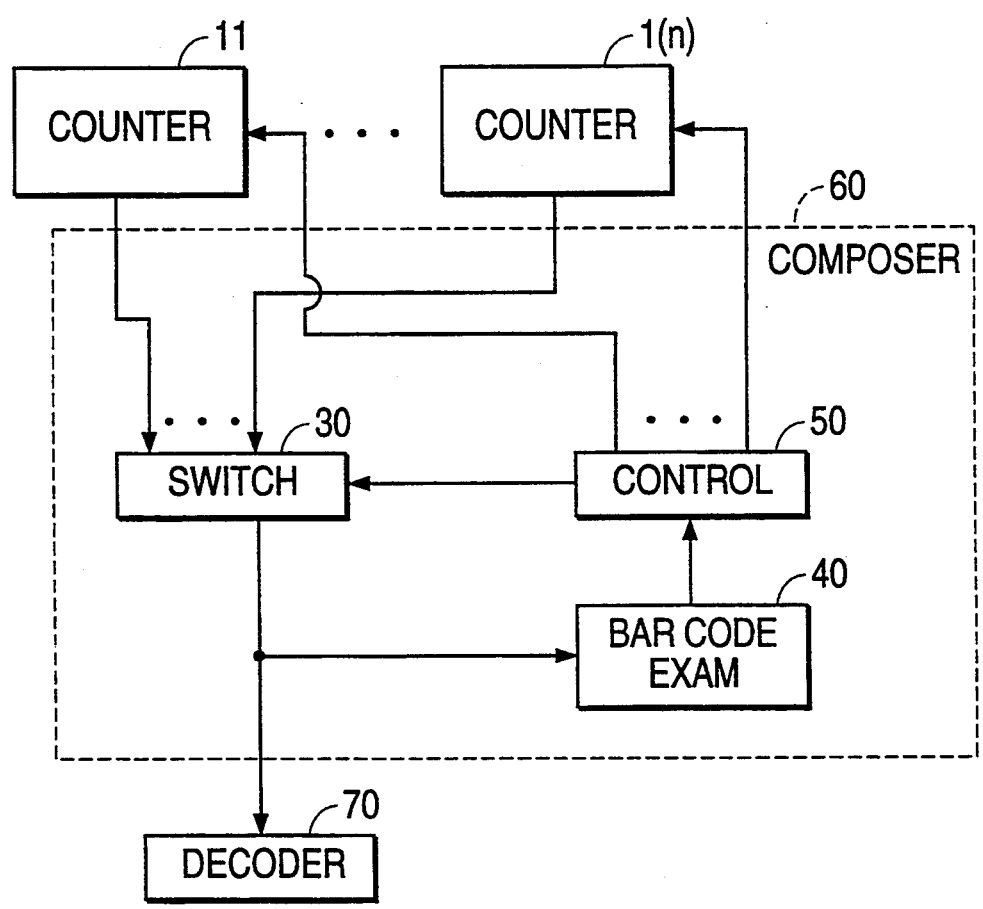
FIG. 8 is a schematic block diagram illustrating a basic function of a composer in the bar code reader of the first embodiment of the present invention.

By providing COMPOSER 60 in the bar code reader, the number of the decoders can be decreased to one, which is a point of the present invention. FIG. 8 is a block diagram for illustrating a basic function of COMPOSER 60.

In FIG. 8, the same reference numerals as in FIG. 6 designate the same respective units as in FIG. 6. The COMPOSER 60 comprises a switching unit (SWITCH) 30 for switching from the numerical data produced in a first COUNTER to the numerical data produced in another, or second, COUNTER and thereby producing a selectively switched numerical data, which is the composed numerical data, to be sent to DECODER 70; a switching controller (CONTROL) 50, for controlling COUNTERs 11 to 1(n) and SWITCH 30 so that the numerical data are sent from a selected COUNTER 11 - - - or 1(n) to SWITCH 30, by selectively sending the appropriate changing command signals to the counters, and a bar code examining (BAR CODE EXAM) unit 40 for performing the overflow examination and the waveform examination on the composed numerical data and sending an examined result signal to CONTROL 50 for making CONTROL 50 operate.

Figure 9:
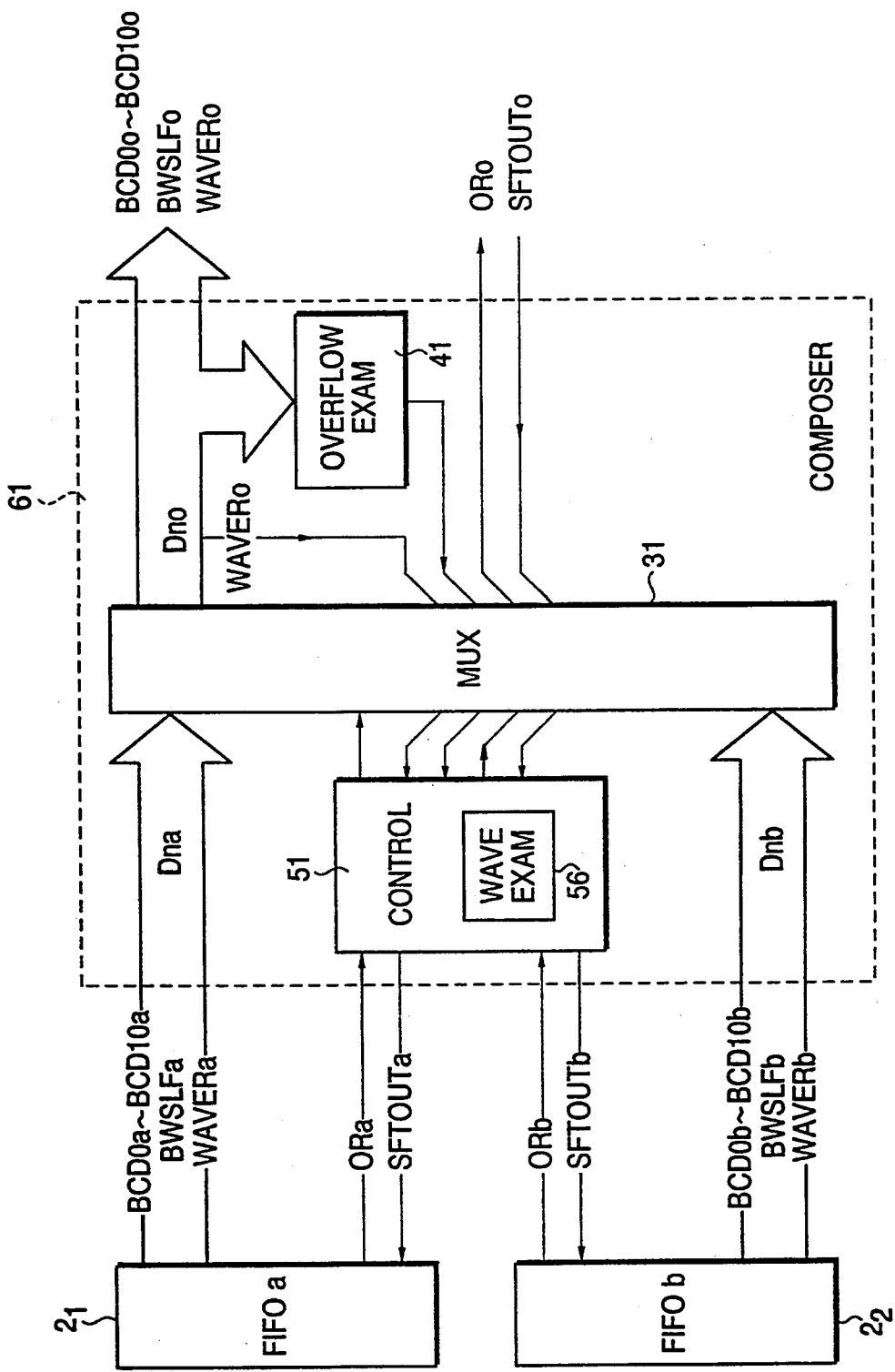
FIG. 9 is a schematic block diagram of the composer in the bar code reader of the first embodiment of the present invention.

FIG. 9 is a schematic block diagram of COMPOSER 61 in a bar code reader of the first embodiment of the present invention, illustrating the data switching carried out by COMPOSER 61. In FIG. 9, the same reference numerals as in FIG. 7 designate the same respective units as in FIG. 7. The COMPOSER 61, corresponding to COMPOSER 60 in FIG. 7 or 8, comprises a multiplexer (MUX) 31 corresponding to SWITCH 30, CONTROL 51 corresponding to CONTROL 50, a waveform examiner (WAVE EXAM) 56 corresponding to a part of BAR CODE EXAM 40, and an overflow examiner (OVERFLOW EXAM) 41 corresponding to another part of BAR CODE EXAM 40 in FIG. 8.

In FIG. 9, various symbols are used to represent the following data or signals: symbols Dna, Dnb and Dno represent the numerical data from FIFOa 21 and FIFOb 22 and the composed numerical data from COMPOSER 61 respectively; symbols BCDOa-10$a$, BCDOb-10$b$ and BCDOo-10$o$ are the numerical data, each of 11 bits and representing the effective width of a corresponding, scanned one of the black and white bars as contained in Dna, Dnb and Dno, respectively; symbols BWSLFa, BWSLFb and BWSLFo are data representing whether the respectively associated BCDOa-10$a$, BCDOb-10$b$ and BCDOo-10$o$ represent a black bar or a white bar; symbols WAVERa, WAVERb and WAVERo are signals representing whether false data, resulting from a waveform error, is included in BCDOa-10$a$, BCDOb-10$b$ and BCDOo-10$o$, respectively; symbols ORa, ORb and ORo are signals representing whether the respectively associated BCDOa-10$a$, BCDOb-10$b$ and BCDOo-10$o$ are ready to be processed in COMPOSER 61, that is, when, for example, ORa is "H" level, BCDOa-10$a$ is ready to be processed in COMPOSER 61; and a symbol SFTOUTa (SFTOUTb) represents a signal for indicating, or instructing, that CONTROL 51 has finished reading BCDOa-10$a$ (BCDOb-10$b$), as sent thereto from FIFOa 21 (FIFOb 22), and a symbol SFTOUTo represents a signal for indicating, or instructing, that DECODER 70 has finished reading BCDOo-10$o$, as sent thereto from COMPOSER 61.

Figure 10:
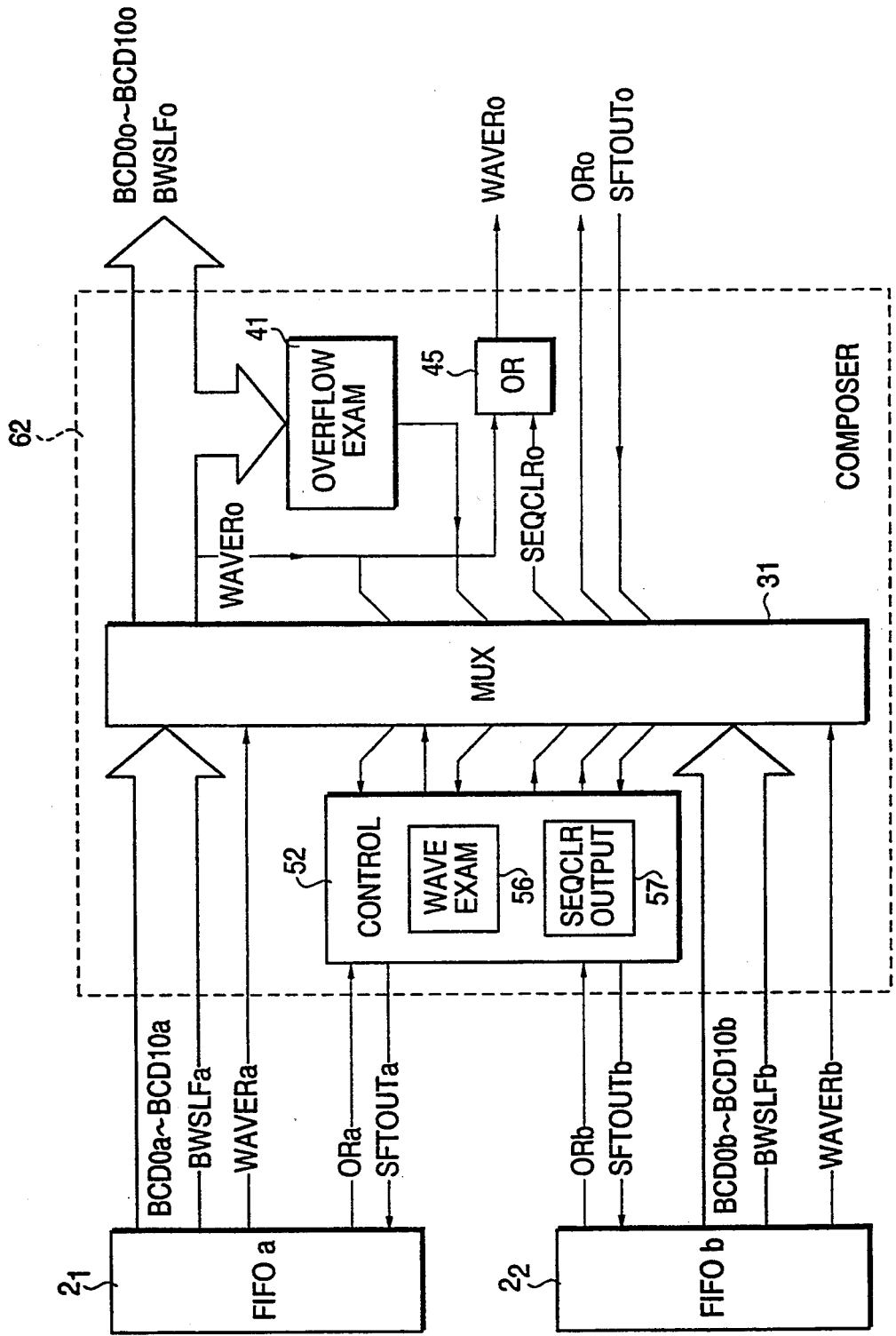
FIG. 10 is a schematic block diagram of a composer in a bar code reader of the second embodiment of the present invention.

FIG. 10 is a schematic block diagram of COMPOSER 62 in a bar code reader of the second embodiment of the present invention, for illustrating the data transfer carried out by COMPOSER 62. In FIG. 10, the same reference numerals or symbols as in FIG. 9 designate the same respective units or data as in FIG. 9. The COMPOSER 62 comprises the same units as in COMPOSER 61 except that an SEQCLR signal output circuit (SEQCLR OUTPUT) 57 and an OR element (OR) 45 are provided in CONTROL 52 and COMPOSER 62, respectively. The SEQCLR OUTPUT 57 produces an output informing that overflow data has been detected by OVERFLOW EXAM 41, and OR 45 performs an OR logical sum on the output from WAVE EXAM 56 and SEQCLR OUTPUT 57. This is for completely removing false data, resulting from the overflow and the waveform error, from the output of COMPOSER 62, without any mistake.

Figure 11A:
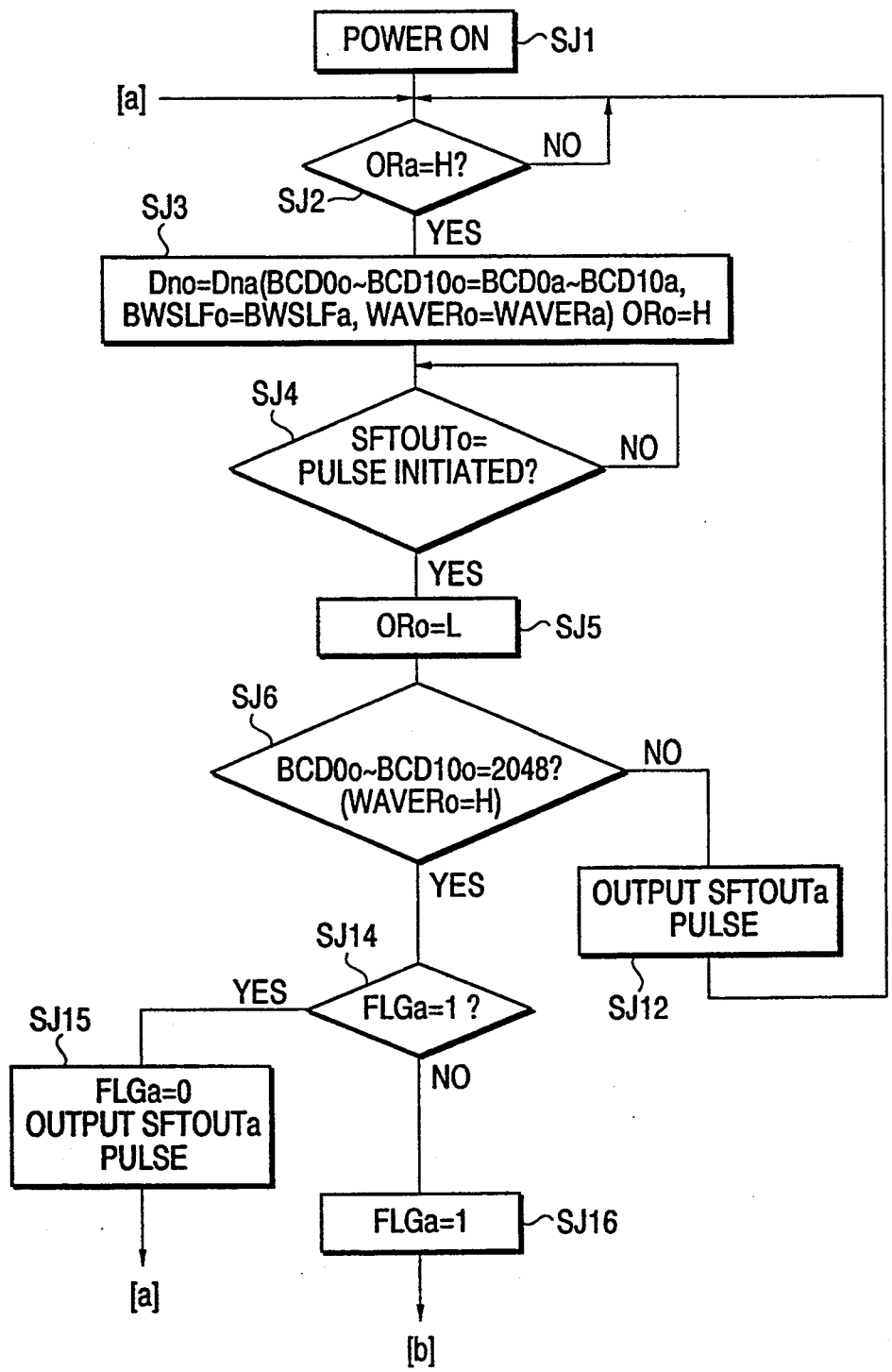
FIG. 11A is a flow chart for explaining the operation of the composer in the bar code reader of the first embodiment of the present invention.
Figure 11B:
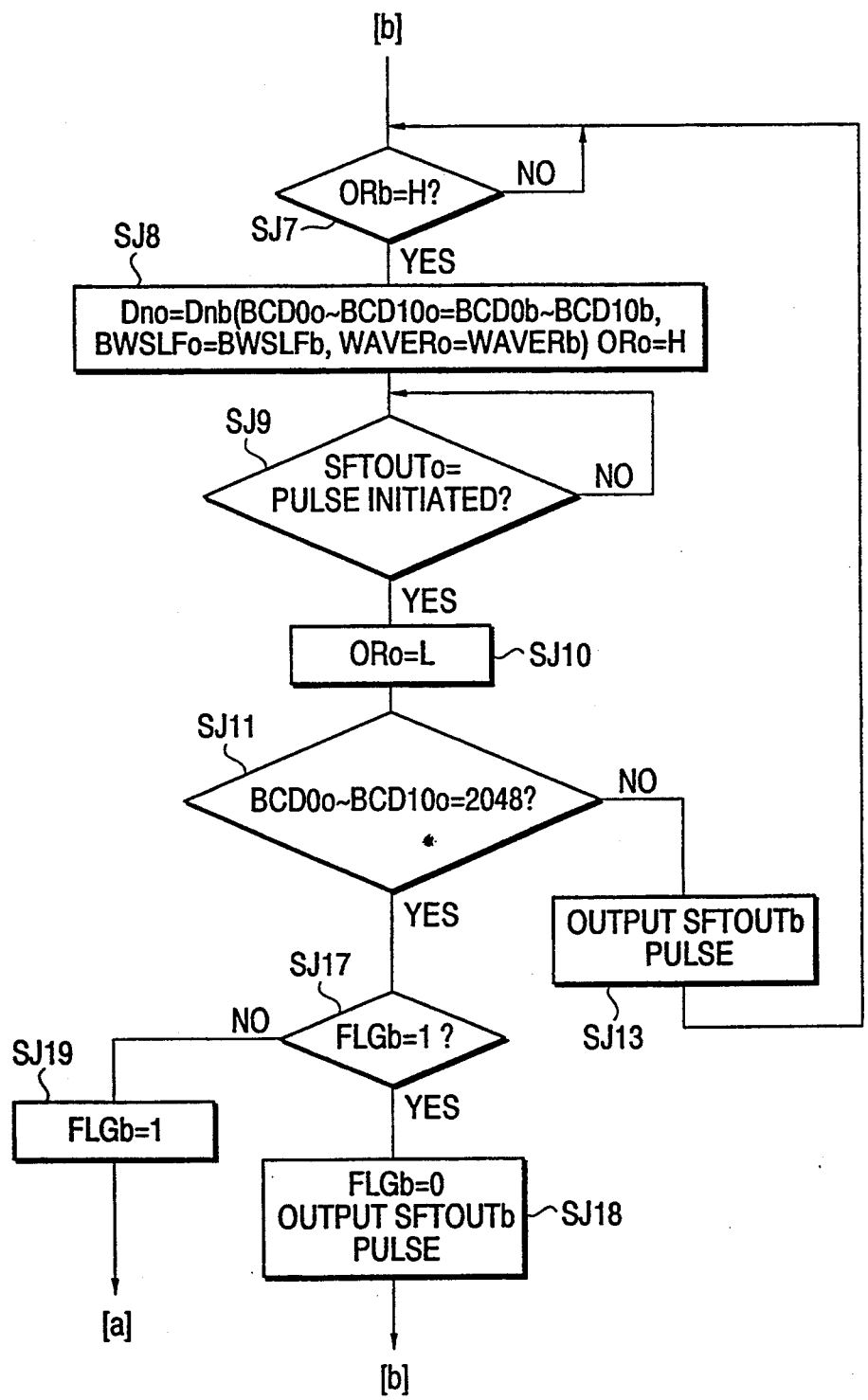
FIG. 11B is a flow chart continuing the flow chart in FIG. 11A.

FIGS. 11A and 11B are the flow charts for explaining the operation of COMPOSER 61 discussed above in relation to the first embodiment and with reference to FIG. 9. The flow chart in FIG. 11A is continued in the flow chart in FIG. 11B. In FIGS. 11A and 11B, the same symbols as in FIG. 9 designate the same respective datum (data) or signals as in FIG. 9.

The operation of COMPOSER 61 proceeds in accordance with steps SJ 1 to SJ 18, shown in FIGS. 11A and 11B.

At step SJ 1, electric power of the bar code reader is turned on.

Then, at step SJ 2, the bar code mark on the object is scanned by SCANNERs 91 and 92, so that the numerical data are held in FIFOa 21 and FIFOb 22 as explained in reference to FIG. 7. The numerical data in FIFOa 21 and FIFOb 22 are sent to MUX 31 in accordance with the associated ORa and ORb, sent from FIFOa 21 and FIFOb 22 to CONTROL 51, respectively. When ORa is "H", CONTROL 51 controls FIFOa 21 and MUX 31 so as to send the numerical data from FIFOa 21 to MUX 31 and select the numerical data for Dn0, respectively.

That is, at step SJ 3, MUX 31 selects Dna for Dno (in each, n=0, 1, . . . ). As a result, the numerical data in FIFOa 21 such as D0a, D1a, D2a, D3a, - - - are selected for the numerical data D0o, D1o, D2o, D3o, - - - to be sent to DECODER 70, respectively. Therein, the selected Dna includes BCDOa-10$a$, representing the data width as a count, or number, of 11 bits, BWSLFa representing whether the numerical data relating to a white bar or a black bar, and WAVERa indicating whether any waveform error data is included in the numerical data held in FIFOa 21.

At step SJ 4, CONTROL 51 detects SFTOUTo output by DECODER 70 when DECODER 70 reads out Dno. Herein, DECODER 70 reads Dno once, even though the Dno includes false data. The DECODER 70 also performs another operation with the Dno, but which does not directly concern the present invention.

Upon receiving SFTOUTo from DECODER 70, CONTROL 51 sends "L" of ORo to DECODER 70 at step SJ 5, for informing that CONTROL 51 is in a pause state of sending Dno.

At step SJ 6, OVERFLOW EXAM 41 examines whether the numerical data BCDOo-10$o$ includes an overflow data of more than 2048 counts. When OVERFLOW EXAM 41 detects no overflow data in BCDOo-10$o$, CONTROL 51 sends SFTOUTa to FIFOa 21 so as to make FIFOa 21 continue to send the numerical data to MUX 31, as shown by step SJ 12. When OVERFLOW EXAM 41 detects the overflow data in BCDOo-10$o$, the step is advanced to SJ 14.

At step SJ 14, CONTROL 51 examines whether present overflow data is same as a last overflow data, by examining whether a flag (FLGa) attached to the present overflow data is "0" or "1". If FLGa is "0", the present overflow data is recognized as not the same as the last overflow data, and if FLGa is "1", the present overflow data is recognized as the same as the last overflow data.

If FLGa is "0" at step SJ 14, CONTROL 51 increases the FLGa to "1" at step SJ 16. The step SJ 16 is provided in the expectation that the present overflow data would appear in the next BCDOa-10$a$, as occurs in a case wherein the margin of the bar code mark is repeatedly scanned by the same SCANNER 91. After step SJ 16, the step is advanced to step SJ 7 shown in FIG. 11B.

At step SJ 15, if FLGa is "1", CONTROL 51 resets the FLGa to "0" and sends SFTOUTa to FIFOa 21 so as to use BCDOa-10a as BCDOo-10o. After step SJ 15, the flow returns to step SJ 2.

At step SJ 7 (FIG. 11B), when the numerical data are ready to be sent from FIFOb 22, FIFOb 22 sends "H" of ORb to CONTROL 51.

Then, at step SJ 8, CONTROL 51 sends a command to MUX 31 so that MUX 31 switches Dno from Dna to Dnb. If a false data appears in D3a, MUX 31 selects D0b, D1b and D2b for D4o, D5o and D6o respectively so as to send D0b, D1b and D2b to DECODER 70. When Dnb thus is sent to DECODER 70 as Dno, the same as in the case of step SJ 3, the 11 bit numerical data BCDOb-10b, the black-white discrimination signal BWSLFb and the waveform examination signal WAVERb are included in Dno.

Other steps SJs 9, 10, 11, 13, 17, 18 and 19 of FIG. 11B are same as steps SJs 4, 5, 6, 12, 14, 16 and 15, respectively, of FIG. 11A; however, suffix "a", attached to the data and the signals in the explanation in reference to FIG. 11A, is changed to suffix "b", and FIFOa 21 and SCANNER 91 are changed to FIFOb 22 and SCANNER 92, respectively, in FIG. 11B. Therefore, only the steps SJs 17, 18 and 19 will be explained below.

At step SJ 17, CONTROL 51 examines whether the present overflow data is same as a last overflow data, by examining whether a flag (FLGb) attached to the present overflow data is "0" or "1". If FLGb is "0", the present overflow data is recognized as not the same as the last overflow data, and if FLGb is "1", the present overflow data is recognized as the same as the last overflow data.

If FLGb is "0" at step SJ 17, CONTROL 51 increases FLGb from "0" to "1" at step SJ 19. The step SJ 19 is provided in the expectation that the present overflow data would appear in the next BCDOb-10b, as occurs in a case wherein the margin of the bar code mark is repeatedly scanned by the same SCANNER 92. After step SJ 19, the step is advanced to step SJ 2 in FIG. 11A.

At step SJ 18, if FLGb is "1", CONTROL 51 resets the FLGb to "0" and sends SFTOUTb to FIFOb 22 so as to use BCDOb-10b as BCDOo-10o. After step SJ 18, the flow returns to step SJ 7.

In the above explanation in reference to FIGS. 11A and 11B, the overflow data appears when SCANNER 91 or 92 scans the margin of the bar code mark or a place which is not the bar code mark. When the beam scans the margin, the numerical data on the bar code appear just before or after the overflow data. As a result, the following data composing is required.

When FIFOa produces Dna such as D0a, D1a, D2a, D3a, D4a, D5a, D6a, . . . and FIFOb produces Dnb such as D0b, D1b, D2b, D3b, D4b, . . . and thus D2a, D5a and D3b, D4b in the above Dna and Dnb, respectively, are the overflow data, the composed numerical data Dno becomes D0a, D1a, D2a, D0b, D1b, D2b, D3b, D2a, D3a, D4a, D5a, D3b, D4b, D5a, D6a, . . . .

As shown in the above numerical data, a series of Dnos are partially composed of Dnas and Dnbs— wherein, the symbols, Dnos, Dnas and Dnbs, express the plural of Dno, Dna and Dnb respectively. When a Dna, which will be called "first Dna" hereinafter, is detected as an overflow data occurring during a series of Dnas which have been selected for Dnos, the first Dna is changed to a Dnb, and a series of Dnbs are selected for subsequent Dnos. When a Dnb is detected as an overflow data occurring in the series of Dnbs, the detected Dnb is changed to a Dna so that another series of Dnas are selected for the respective, subsequent Dnos. In this case, the first Dna, comprising the overflow data, is selected as the leading Dna of the series of Dnas.

This will be understood from the series of the composed numerical data Dno (Dnos) arranged above as: D0a, D1a, D2a, D0b, D1b, D2b, D3b, D2a, D3a, D4a, D5a, D3b, D4b, D5a, D6a . . . .

At the step SJ 6 in FIG. 11A or SJ 11 in FIG. 11B, the waveform examination is performed. When the waveform error data is detected at step SJ 6, the step is advanced to step SJ 2, and when the waveform error data is detected at step SJ 11, the step is advanced to step SJ 7. These are same as the case of the overflow data.

In case of the second embodiment, when the numerical data are switched at step SJ 3 or SJ 8 because of the detection of the overflow data, SEQCLR 57 of CONTROL 52 in FIG. 10 sends the SEQCLRo signal to OR 45. Receiving the SEQCLRo and WAVERo, OR 45 performs the logical sum of SEQCLRo and WAVERo. If both or one of SEQCLRo and WAVERo is "1", OR 45 produces an output "1" to be sent to DECODER 70. Receiving the "1" from OR 45, DECODER 70 completely removes Dnos after the false data. Doing thus, the mistake of reading the bar code mark can be avoided occurring though the numerical data are changed frequently in Dno.

Figure 12:
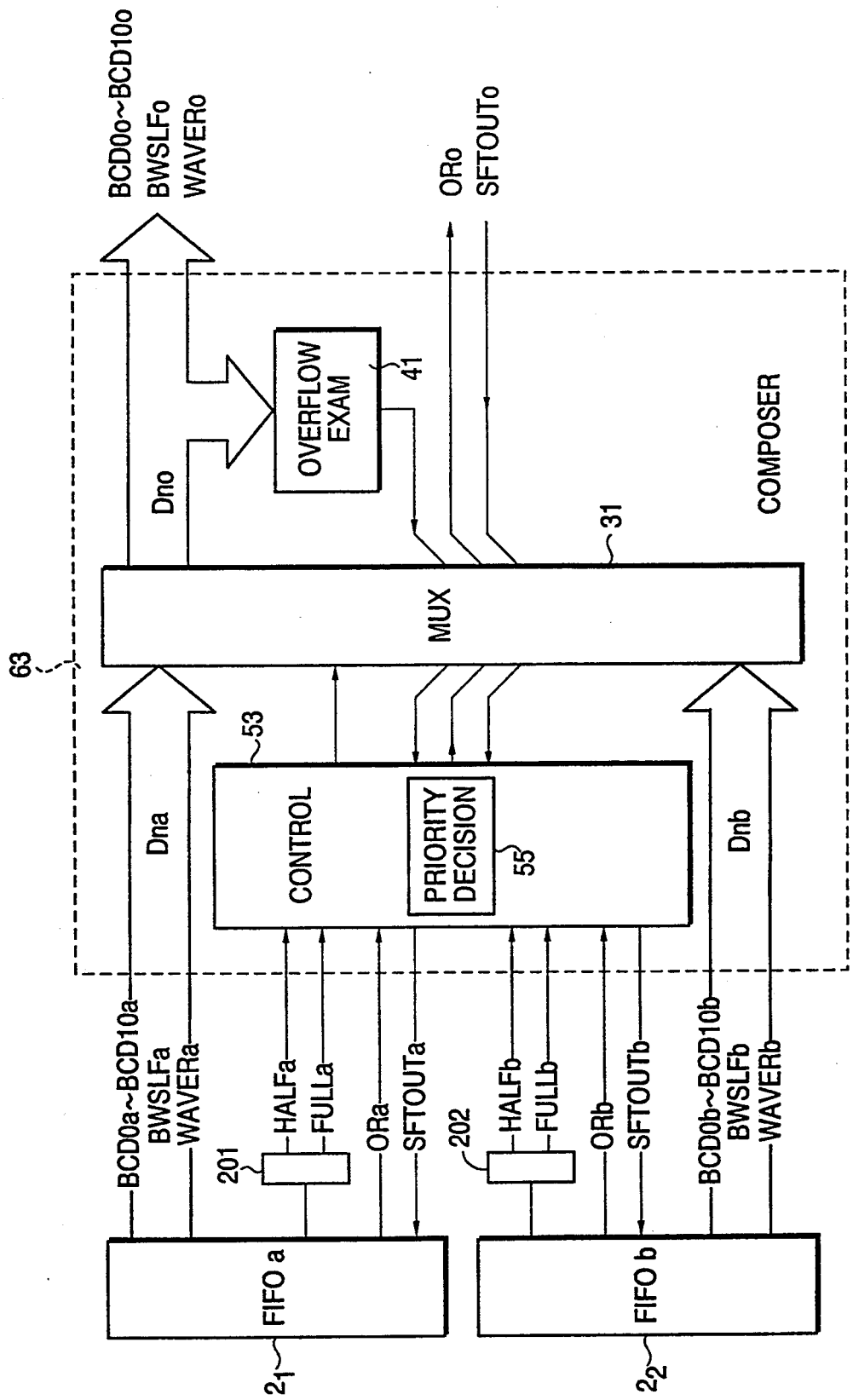
FIG. 12 is a schematic block diagram for illustrating a composer in a bar cod reader of the third embodiment of the present invention.
Figure 13:
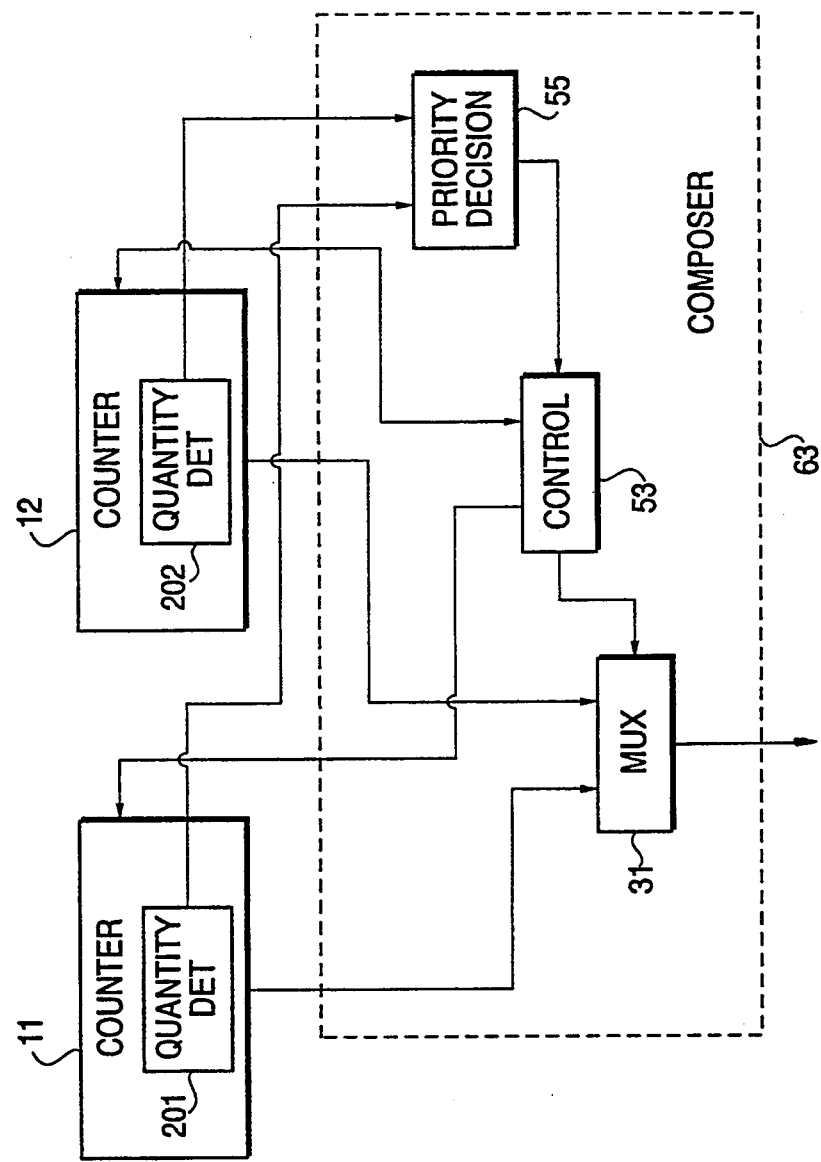
FIG. 13 is a schematic block diagram for illustrating the function of the third embodiment.

FIG. 12 is a block diagram for illustrating a COMPOSER 63 in a bar code reader in accordance with a third embodiment of the present invention, and FIG. 13 is a schematic block diagram for illustrating the function of the third embodiment. In FIGS. 12 and 13, the same reference numerals or symbols as in FIG. 10 designate the respective same units or signals as in FIG. 10. In CONTROL 53 of COMPOSER 63, a priority decision unit (PRIORITY DECISION) 55 is provided for determining the usage priority of the numerical data from FIFOa 21 and FIFOb 22. In COUNTERs 11 and 12, data quantity detectors (QUANTITY DETs) 201 and 202 are provided respectively. The QUANTITY DETs 201 and 202 detect the quantity of the numerical data in FIFOa 21 and FIFOb 22 and produce signals FULLa and HALFa and signals FULLb and HALFb, respectively. The FULLa and FULLb are for informing a full condition—i.e., that the amount of the numerical data already held in FIFOa 21 and FIFOb 22 is at the full data holding capacity thereof, respectively. The HALFa and HALFb are for informing that the numerical data held in FIFOa 21 and FIFOb 22 amount to less than one half of their respective data holding capacities. The PRIORITY DECISION 55 compare the data quantity in FIFOa 21 and FIFOb 22 by using signals FULLa and FULLb and signals HALFa and HALFb and produces a priority signal informing a usage priority ranking of FIFOa 21 and FIFOb 22, to MUX 31. This is for making MUX 31 select the numerical data produced from FIFOa 21 and FIFOb 22 in accordance with the usage priority ranking.

The operation of PRIORITY DECISION 55 will be explained in a case where OVERFLOW EXAM 41 detects the overflow data in Dna selected for Dno. In this case, if FULLa is sent from FIFOa 21 to PRIORITY DECISION 55 and HALFb is sent from FIFOb 22 to PRIORITY DECISION 55, PRIORITY DECISION 55 determines the priority on Dna so as to make MUX 31 select Dna for Dno, until HALFa is sent from FIFOa 21 and HALFb is not sent from FIFOb 22 or FULLb is sent from FIFOb 22 to PRIORITY DECISION 55. When HALFb is not sent from FIFOb 22, PRIORITY DECISION 55 removes the priority so that MUX 31 performs the ordinary selection. Applying PRIORITY DECISION 55 to CONTROL 53 thus, the bar code can be read with high efficiency.

FIG. 14 is a schematic diagram for illustrating a bar code reader of the fourth embodiment of the present invention. In FIG. 14, the same reference numerals or symbols as in FIGS. 7 and 9 designate the same respective units or signals as in FIGS. 7 and 9. As shown in FIG. 14, the bar code reader consists of three SCANNERs 91, 92 and 93, three COUNTERs 11, 12 and 13 connected with SCANNERs 91, 92 and 93, respectively, and two COMPOSERs, COMPOSER 6 for composing the numerical data Dna from COUNTER 11 and Dnb from COUNTER 12, COMPOSER 16 for composing the numerical data Dnc from COUNTER 13 and the composed numerical data Dno' from COMPOSER 6, and DECODER 7 for decoding the composed numerical data from COMPOSER 16 and producing as an output the corresponding bar code signal. In the fourth embodiment, Dna or Dnb is selected for Dno' by COMPOSER 6 and Dno' or Dnc is selected for Dno by COMPOSER 16. Therefore, there are two cases for selecting Dno at COMPOSER 16, i.e., where Dna or Dnc is selected and Dnb or Dnc is selected. From the above, it is realized that Dnc is used most frequently. As a result, it can be concluded that in the bar code reader of the fourth embodiment, SCANNER 93 must be arranged at a place where the bar code mark on the object can be scanned by SCANNER 93 most effectively.

The number of the scanners is not limited to three, as explained in the fourth embodiment, and more than three scanners can be used in association with a number (N-1) of composers which is one (1) less than the number (N) of scanners and with one decoder.

We claim:

1. A bar code reader for producing a bar code signal output by optically reading a bar code mark containing bar code information, each bar code mark comprising plural bars of alternating first and second types and of respective, selected widths representing the bar code information, said bar code reader comprising:

plural scanners, each scanner producing a corresponding optical beam, scanning the bar code mark with the optical beam, receiving light reflected from the bar code mark scanned by the optical beam, and detecting the reflected light so as to produce an electrical analog signal including the bar code information of the scanned bar code mark;

plural counters respectively corresponding to said scanners, each counter receiving a respective analog signal and converting the received analog signal into a corresponding digital signal including the bar code information, the respective, selected widths of the plural bars of the bar code mark being converted to a sequence of numerical count data in the digital signal, the plural counters comprising at least an initial and a next successive counter;

a composer associated with the initial and the next successive counter, each further next successive counter having a further composer associated therewith, each composer having first and second inputs receiving respective, first and second digital signals comprising respective sequences of numerical count data and producing from the received, first and second digital signals a composed numerical digital signal output; and a decoder which receives the composed numerical digital signal output and decodes the received composed numerical digital signal output into a bar code signal output representing the bar code information.

2. A bar code reader according to claim 1, wherein each composer comprises:

data switching means selectively operable for switching to, and thereby selecting between, the numerical count data of said counters; and control means for controlling said data switching means and said counters so as to make said data switching means perform said switching.

3. A bar code reader according to claim 2, wherein said composer further comprises data examination means for examining whether the numerical count data, which comprises the composed numerical digital signal output is bar code data and for instructing said data switching means to perform said switching when said data examination means produces an output indicating that the examined numerical count data is not bar code data.

4. A bar code reader according to claim 3, wherein said data examination means comprises an overflow examiner which examines whether the numerical value of the numerical count data of the composed numerical digital signal output exceeds a maximum, previously designated value.

5. A bar code reader according to claim 3, wherein said data examination means further comprises a waveform examiner which examines whether a waveform error data is present in the numerical count data of the digital signals produced by said counters, by examining whether the numerical count data of the digital signals produced by said counters includes numerical data having a value less than a minimum previously designated value.

6. A bar code reader according to claim 2 further comprising:

respective data quantity detection means, in said counters, for detecting the quantity of the numerical count data to be produced by said counters and producing respective quantity signals representing the detected quantity; and priority decision means for determining usage priority of the numerical count data produced by said counters by using the detected quantity signals and producing and supplying to said control means a priority signal designating a usage priority ranking of said counters, said control means making said data switching means switch to and thereby select the numerical count data of a corresponding counter, selected in accordance with the usage priority ranking of the corresponding counter.

7. A bar code reader according to claim 3 further comprising:

respective data quantity detection means, in said counters, for detecting the quantity of the numerical count data to be produced by said counters and producing respective quantity signals representing the detected quantity; and priority decision means for determining usage priority of the numerical count data produced by said counters by using the detected quantity signals and producing and supplying to said control means a priority signal designating a usage priority ranking of said counters, said control means making said data switching means switch to and thereby select the numerical count data of a corresponding counter, selected in accordance with the usage priority ranking of the corresponding counter.

8. A bar code reader according to claim 4 further comprising:

respective data quantity detection means, in said counters, for detecting the quantity of the numerical count data to be produced by said counters and producing respective quantity signals representing the detected quantity; and priority decision means for determining usage priority of the numerical count data produced by said counters by using the detected quantity signals and producing and supplying to said control means a priority signal designating a usage priority ranking of said counters, said control means making said data switching means switch to and thereby select the numerical count data of a corresponding counter, selected in accordance with the usage priority ranking of the corresponding counter.

9. A bar code reader according to claim 5 further comprising:

respective data quantity detection means, in said counters, for detecting the quantity of the numerical count data to be produced by said counters and producing respective quantity signals representing the detected quantity; and priority decision means for determining usage priority of the numerically count data produced by said counters by using the detected quantity signals and producing and supplying to said control means a priority signal designating a usage priority ranking of said counters, said control means making said data switching means switch to and thereby select the numerical count data of a corresponding counter, selected in accordance with the usage priority ranking of the corresponding counter.

10. A barcode reader for optically reading a barcode mark representing corresponding numerical data and producing a barcode signal representing barcode information contained in the barcode mark, the barcode mark comprising a succession of alternating first and second types of bars, the bars being of respective and selectively different widths and the selected width of each bar defining the numerical value of the corresponding barcode data, said barcode reader comprising:

a plurality of N scanners, each scanner producing a corresponding optical beam, scanning the barcode mark with the optical beam and receiving a reflected light beam from the scanned barcode mark, the scanner detecting the reflected and received light beam and producing, in response thereto and as an output thereof, a corresponding electrical barcode signal containing the barcode information of the scanned barcode mark, the electrical barcode signal comprising a succession of barcode data signals respectively corresponding to the succession of alternating first and second types of bars of the scanned barcode mark, the duration of each data signal being determined by the width of the corresponding, scanned bar of the barcode mark and thereby the numerical value of the barcode data represented by the corresponding, scanned bar of the barcode mark;

a plurality of N counters respectively associated with said plurality of scanners, each counter of said plurality of counters receiving and converting the barcode signal output of the respective barcode scanner, corresponding to each scanned barcode mark, into a numerical data signal as the output thereof, the numerical data signal comprising a succession of numerical data signals respectively corresponding to the succession of first and second types of bars and the respective widths thereof;

N-1 composers, each composer having first and second inputs and an output, a first of the N-1 composers having the first and second inputs thereof connected to and receiving the respective numerical data signal outputs of first and second counters, of the plurality of N counters, and producing a corresponding, composed numerical data signal as the output thereof and each successive composer, of the N-1 composers having the first input thereof connected to the output of a respective, next successive counter, of the plurality of N counters and the second input thereof connected to the output of the preceding composer, of the N-1 composers, and producing a corresponding, composed numerical data signal as the output thereof, each composer further comprising:

means for selecting, and for supplying as the output of the composer, a succession of numerical data signals of the selected one of first and second numerical data signal inputs of the first and second inputs thereto;

means for detecting a false numerical data signal, in the succession of numerical data signals of the selected one of the first and second numerical data signal inputs thereto, for causing the selecting means to select the other of the first and second numerical data signal inputs thereto and thereby to supply the succession of numerical data signals of the other, selected numerical data signal as the composed numerical data signal output thereof; and means for producing a numerical data error signal concurrently with each false numerical data signal for cancelling the false numerical data signal from the composed numerical data signal output of the composer; and a decoder which receives, and decodes, the composed numerical data signal output of the composer and produces as an output thereof the numerical data represented by the barcode mark.

* * * * *

UNITED STATES PATENT AND TRADEMARK OFFICE
CERTIFICATE OF CORRECTION

PATENT NO. : 5,404,004
DATED : April 4, 1995
INVENTOR(S) : SATO et al.

It is certified that error appears in the above-indentified patent and that said Letters Patent is hereby corrected as shown below:

Col. 13, line 33, change "numerically" to --numerical--.

Signed and Sealed this

Thirty-first Day of October 1995

Attest:

BRUCE LEHMAN

Attesting Officer   Commissioner of Patents and Trademarks